United States Patent [19]

Yamada

[11] Patent Number: 4,897,728

[45] Date of Patent: Jan. 30, 1990

[54] CHARGE TRANSFER DEVICE FOR SOLID STATE IMAGE PICKUP APPARATUS AND METHOD OF DRIVING THE SAME

[75] Inventor: Tetsuo Yamada, Yokohama, Japan

[73] Assignee: Kabushiki Kaisha Toshiba, Kawasaki, Japan

[21] Appl. No.: 254,178

[22] Filed: Oct. 6, 1988

[30] Foreign Application Priority Data

Oct. 9, 1987 [JP] Japan ................... 62-255302

[51] Int. Cl.$^4$ ................................. H04N 3/14
[52] U.S. Cl. .................. 358/213.23; 358/213.22; 358/213.29
[58] Field of Search .............. 358/213.29, 213.26, 358/213.22, 213.23, 909

[56] References Cited

U.S. PATENT DOCUMENTS

| 4,263,623 | 4/1981 | Woo et al. ................... 358/909 |
| 4,541,010 | 9/1985 | Alston ........................ 358/909 |
| 4,553,167 | 11/1985 | Kinoshita .................. 358/213.22 |
| 4,581,652 | 4/1986 | Kinoshita et al. .......... 358/213.29 |

OTHER PUBLICATIONS

Horii et al., "A New Configuration of CCD Imager with a Very Low Smear Level—FIT-CCD Imager," IEEE Transactions on Electron Devices, vol. ED-31, No. 7, Jul. 1984, pp. 904–909.

*Primary Examiner*—Jin F. Ng
*Assistant Examiner*—Stephen Brinich
*Attorney, Agent, or Firm*—Foley & Lardner, Schwartz, Jeffery, Schwaab, Mack, Blumenthal & Evans

[57] ABSTRACT

The solid state image pickup apparatus comprises photosensitive element columns (1) made up of a plurality of photosensitive elements (I) and charge storage/transfer devices each having a cyclic transfer path (12) including a plurality of loop-linked transfer stages (8, 9, 10 and 11) for transferring and storing signal charges outputted by the photosensitive element column (1). The cyclic transfer path (12) can freely rearrange the order of outputted signal charges by controlling timings at which signal charges are received by or transmitted from the cyclic transfer path. Further, the apparatus includes a parallel transfer device (17) in each cyclic transfer path (12) which can simultaneously transfer signal charges stored in a predetermined one of transfer stages (8 and 9) to other transfer stages (9 and 8) through the cyclic transfer path (12) for the purpose of reversing the arrangement order of the signal charges.

19 Claims, 9 Drawing Sheets

FIG. I PRIOR ART

CHARGE TRANSFER DEVICE FOR SOLID STATE IMAGE PICKUP APPARATUS AND METHOD OF DRIVING THE SAME

BACKGROUND OF THE INVENTION

1. Field of the Invention

The present invention generally relates to a solid state image pickup apparatus and more specifically to an improvement in the construction of its charge transfer device of the apparatus and a method of driving the same.

2. Description of the Prior Art

FIG. 1 is a plan view useful to explain a prior art solid state image pickup apparatus of FIT (frame interline transfer) type. In FIG. 1, there are alternately arranged in the row (from left to right) direction photosensitive element columns 1 including 8 photosensitive elements $I_1$ to $I_8$, for instance, and column direction transfer devices 2 for transferring signal charges of each photosensitive element column 1 in the column (from top to bottom) direction. Further, the column direction charge transfer device 2 is made up of 4 stages, each stage corresponding to 2 photosensitive elements.

On each lower side of each column direction charge transfer device 2, is provided a selective electrode 3, and thereunder a pair of two column charge storage/transfer devices 4 and 5 are arranged. This selective electrode 3 electrically connects each column direction charge transfer device 2 to one of the charge storage/transfer devices 4 and 5. A pair of charge storage/transfer devices 4 and 5 includes a total of 8 transfer stages and functions as a frame memory for storing all signal charges ① to ⑧ of the 8 one column photosensitive elements. In more detail, odd numbered signal charges ①, ③, ⑤ ⑦ (1st field) of photosensitive elements are read out into transfer stages of the column direction charge transfer device 2, and then alternately transferred to the charge storage/transfer devices 4 and 5 via the selective electrode 3. Upon completion of the first field column direction- transfer operation, even numbered signal charges ②, ④, ⑥ and ⑧ (2nd field) of photosensitive elements are read out into corresponding transfer stages of the column direction charge transfer device 2, and then transferred in the column direction as in the first field. FIG. 1 shows the signal charge arrangement in the charge storage/transfer devices 4 and 5 obtained when the second field column direction transfer operation has been completed. Thereafter, all signal charges ① of all columns are parallelly or simultaneously transferred to a row direction transfer device 6, and then transferred in the row direction (from right to left in FIG. 1). Thereafter the signal charges are outputted through an output circuit 7 as electric signals. The same charge transfer operation is consecutively repeated in the order of ③, ⑤, ⑦, ②, ④, ⑥ and ⑧.

In the prior art solid state image pickup apparatus described above, transfer stages of the charge storage/transfer devices are formed integrally along the row direction because of a restriction on wirings. Therefore, all charge storage/transfer devices can only transfer signal charges in the same direction (from top to bottom in FIG. 1) at the same time. Therefore, the charge arrangement is limited to only the one shown in FIG. 1 when all signal charges are stored in the charge storage/transfer devices after twice column direction charge transfer operations of 1st field and 2nd field. In other words, it is impossible to output signal charges in the order of row numbers ①, ②, ③, ④, ⑤, ⑥, ⑦ and ⑧. Therefore, it is difficult to process charge signals, for instance when a vertical correlation processing is required between two adjacent rows.

Further, in a apparatus in which each of transfer stages of the column direction transfer device 2 corresponds to 4 photosensitive elements arranged in the column direction, it is difficult to form one field signals suitable for television signals, because signal charges are read out in the order of ①, ⑤, ②, ⑥, ③, ⑦, ④ and ⑧. In other words, it is necessary to provide at least one transfer stage for every two photosensitive elements.

In addition, since the charge transfer capacity is roughly proportional to the area of one transfer stage, it is necessary to increase the channel width (right and left direction in FIG. 1) of the column direction charge transfer devices in order to obtain a large charge transfer capacity. This causes another problem when the apparatus is required to be highly integrated.

Further, since each selective electrode must transfer signal charges to two charge storage/transfer devices, it is necessary to increase the charge transfer speed in this charge selection operation.

SUMMARY OF THE INVENTION

Therefore, it is the primary object of the present invention to provide a solid state image pickup apparatus and a method of driving the same which can output signal charges in any desired order.

According to one aspect of this invention, there is provided a solid state image pickup apparatus comprising photosensitive element columns each including a plurality of photosensitive elements for detecting signal charges, and charge storage/transfer devices each having a cyclic transfer path made up of a plurality of loop-linked transfer stages for storing and transferring the signal charges outputted from the photosensitive element columns.

In a modified embodiment, the solid state image pickup apparatus further comprises parallel transfer devices for simultaneously transferring signal charges from a plurality of transfer stages constituting a part of the cyclic transfer paths to other transfer stages.

According to the other aspect of this invention, there is provided a method of driving a solid state image pickup apparatus having photosensitive element columns each including a plurality of photosensitive elements for detecting signal charges, and charge storage/transfer devices each having a cyclic transfer path made up of a plurality of loop-linked transfer stages for receiving and transferring the signal charges outputted from the photosensitive element column, the method comprising the steps of cyclically transferring received signal charges in the cyclic transfer path, and controlling timings at which succeeding signal charges are received by the cyclic transfer path to rearrange a sequence of the signal charges in a desired order. In a modified embodiment, the method of this invention further comprises the steps of: cyclically transferring signal charges received by the cyclic transfer path; and controlling timings at which the signal charges are outputted to output the signal charges in any given order. In another embodiment, the method of the present invention further comprises the step of parallelly transferring signal charges in the cyclic transfer paths by parallel transfer devices provided in the same cyclic transfer paths for the purpose of reversing the arrangement order of the signal charges.

In the solid state image pickup apparatus of the present invention, signal charges outputted from the photosensitive element column are transferred to the cyclic transfer path of the charge storage/transfer device. The cyclic transfer path cyclically transfers the received signal charges and receives the following transferred signal charges at any desired empty transfer stages by controlling the reception timings of signal charges. As a result, the cyclic transfer paths can store signal charges in any desired order irrespective of the order of signal charges transferred to the cyclic transfer paths, and output the stored signal charges in any desired order. Further, it is also possible to output signal charges in any desired order by controlling the output timing of the charges from the cyclic transfer path.

DETAILED DESCRIPTION OF THE PREFERRED EMBODIMENTS

Figure 1:
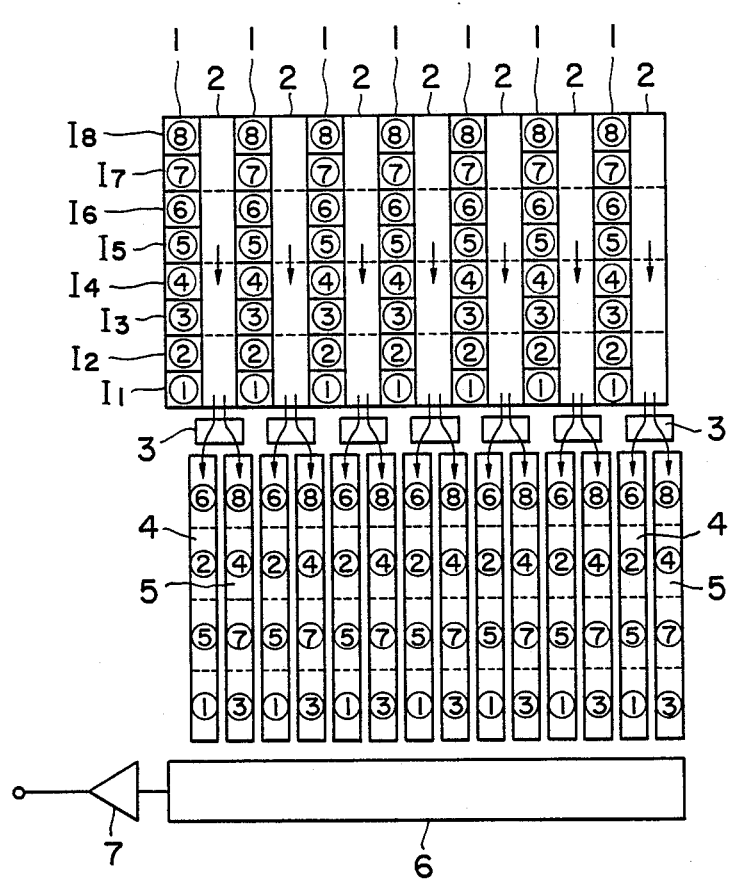
FIG. 1 is a block diagram showing a prior art solid state image pickup apparatus.
Figure 2:
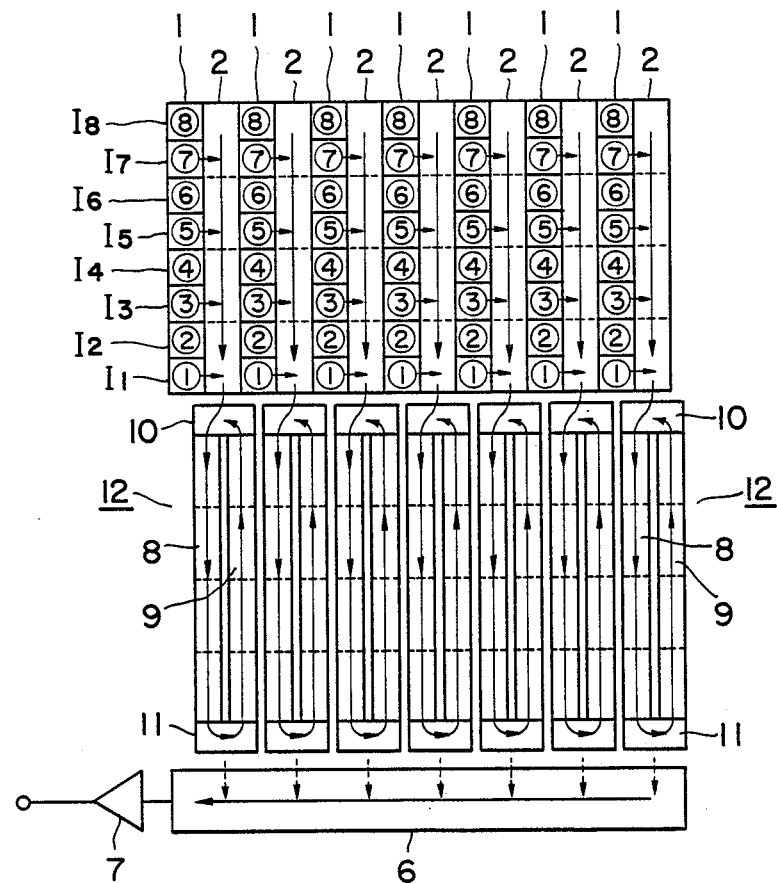
FIG. 2 is a block diagram showing a first embodiment of a solid state pickup apparatus of the present invention.

FIG. 2 shows a first embodiment of the solid state image pickup apparatus of the present invention. In FIG. 2, photosensitive element columns 1 made up of, for instance, 8 photosensitive elements $I_1$ to $I_8$ and column direction charge transferring devices 2 for transferring signal charges from the top to the bottom (in the vertical direction in FIG. 2) are alternately arranged in the row direction. The column direction charge transfer device 2 has 4 transfer stages, each transfer stage being provided so as to correspond to 2 photosensitive elements.

A pair of column direction charge storage/transfer devices 8 and 9 is provided on the lower side of each column direction charge transfer device 2. A pair of the charge storage/transfer devices 8 and 9 is connected to each other at both the top and bottom ends via a first connecting section 10 and a second connecting section 11 to construct a loop-linked cyclic transfer path 12 made up of 8 stage transfer paths for effecting a cyclic transfer of signal charges in the arrow direction. The 8 stage cyclic transfer path 12 functions as a frame memory for storing all signal charges of from ① to ⑧. The first connecting section 10 functions as an input section of the cyclic transfer path for receiving signal charges from the column direction charge transfer device 2 and for transferring the received signal charges to the charge storage/transfer device 8 (on the left side), while the second connecting section 11 functions as an output section of the cyclic transfer path for receiving signal charges from the left charge storage/transfer device 8 and for transferring the received signal charges to a row direction charge transfer device 6.

On the lower side of the cyclic transfer paths 12, there are provided a row direction charge transfer device 6 and an output circuit 7 as in the prior art apparatus.

A first driving method of the described first embodiment will be described with reference to FIGS. 3(a) to 3(e).

By the first column direction transfer operation, odd numbered signal charges are ①, ③, ⑤ and ⑦ are transferred. The signal charges outputted from the column direction charge transfer device 2 are transferred to the left charge storage/transfer device 8 via the first connecting section 10. This left charge storage transfer device 8 first receives the signal charge ① and then transfers this charge ① by 2 stages in the downward direction. When the charge ① is transferred to the 3rd stage, the device 8 receives the succeeding charge ③. The signal charges outputted from the charge storage/transfer device 8 are transferred via the second connecting section 11 to the right charge storage/transfer device 9. The right charge storage/transfer device 9 transfers signal charges in the upward direction in the same manner as in the left device 8. That is, signal charges outputted from the right charge storage/transfer device 9 are transferred to the left charge storage/transfer device 8 via the first connecting section 10. As described above, the signal charges ①, ③, ⑤ and ⑦ are transferred cyclically in the counterclockwise direction with an empty transfer stage interposed between the two signal charges as shown in FIG. 3(a).

Figures 3A, 3B, 3C, 3D, 3E:
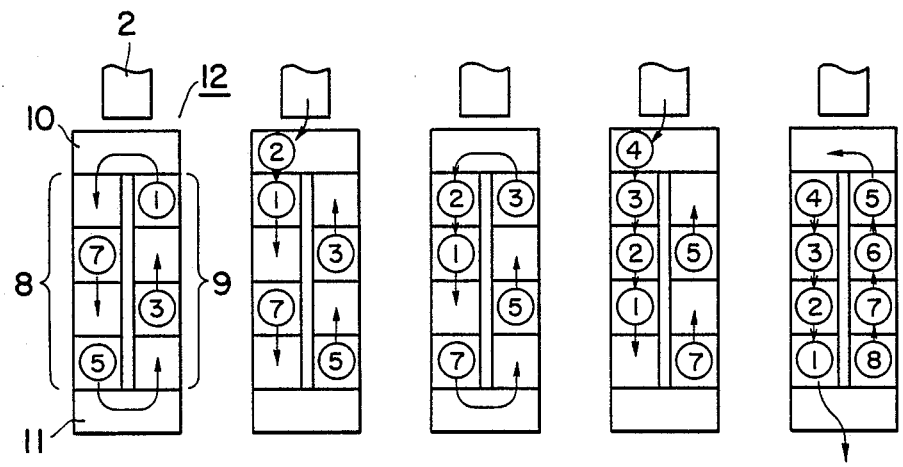
FIGS. 3(a) to 3(e) are a series of illustrations showing charge storage/transfer devices useful to explain a first driving, method of the first embodiment.

As shown in FIG. 3(b), when the signal charge ① is cyclically transferred to the left charge storage/transfer device 8, even numbered signal charges ②, ④, ⑥ and ⑧ are transferred by the succeeding (2nd) column direction transfer operation. First, a signal charge ② is transferred to an empty transfer stage following the signal charge ① as shown in FIG. 3(c). Thereafter, a signal charge ④ transferred to an empty transfer stage following the signal charge ③ as shown in FIG. 3(d). By repeating these operations, all signal charges ① to ⑧ are stored in the cyclic transfer path 12 in the order of the row numbers.

As shown in FIG. 3(e), after the first signal charge ① is transferred to the lowermost transfer stage of the left charge storage/transfer device 8, this charge ① outputted from the left charge storage/transfer device 8 to the row direction charge transfer device 6, and the subsequent charges ② to ⑧ are outputted in the same manner. As a result, all signal charges ① to ⑧ are outputted to the outside via the output circuit 7 in the order of the row numbers.

A second driving method of the first embodiment will be explained with reference to FIGS. 4(a) to 4(e). In this method, the column direction transfer operation for each frame is divided into 4 operations. That is, one half of the odd numbered signal charges, namely ① and ⑤ are transferred by the first column direction transfer operation; one half of the even numbered signal charges, namely ② and ⑥ are transferred by the second column direction transfer operation; remaining one half odd numbered signal charges, namely ③ and ⑦ are transferred by the third column direction transfer operation; and remaining one half of the even numbered signal charges ④ and ⑧ are transferred by the fourth column direction transfer operation.

Figures 4A, 4B, 4C, 4D, 4E:
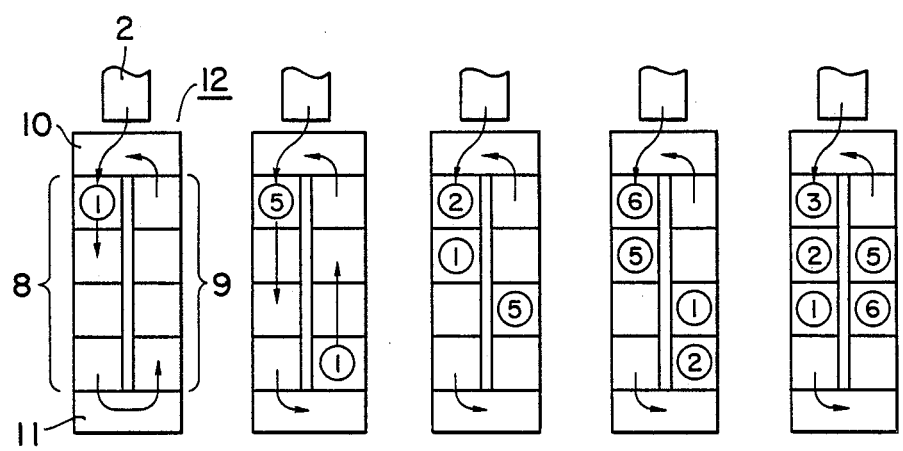
FIGS. 4(a) to 4(e) are a series of illustrations showing the same devices helpful to explain a second driving method of the first embodiment.

As depicted in FIG. 4(a), a signal charge ① is transferred to the cyclic transfer path 12 by the first column direction transfer operation. The cyclic transfer path 12 receives this signal charge ① and transfers this charge by 4 stages, and receives the succeeding signal charge ⑤ when the charge ① is transferred to the fourth downward stage as shown in FIG. 4(b). As described above, the signal charges ① and ⑤ to be transferred in the first column direction transfer operation are stored in the cyclic transfer path 12 with 3 empty transfer stages interposed between the two signal charges as shown in FIG. 4(b).

When the 2nd column direction transfer operation starts, a signal charge ② is transferred to an empty transfer stage following the signal charge ① of the cyclic transfer path 12 as shown in FIG. 4(c). Thereafter, the signal charge ⑥ is transferred to an empty transfer stage following the signal charge ⑤ as shown in FIG. 4(d).

In the 3rd column direction transfer operation, a signal charge ③ is transferred to an empty transfer stage following the signal charge ② in the same manner as shown in FIG. 4(e). The same operations are repeated, so that all signal charges ① to ⑧ are stored in the cyclic transfer path in the order of the row numbers. Thereafter, all signal charges ① to ⑧ are sequentially outputted from the row direction charge transfer device 6 in the same manner as in the first driving method.

This second driving method is particularly effective when one transfer stage of the column direction charge transfer device is formed so as to correspond to 4 photosensitive elements of a photosensitive column.

The width of the transfer path in the column direction charge transfer device is inevitably required to be reduced where the degree of integration of the elements becomes high. On the other hand, the transfer capacity is roughly proportional to an area of each transfer stage. Therefore, in order to obtain any required transfer capacity, it is necessary to lengthen the transfer path to cover several photosensitive elements. In this case, since only a single signal charge can be transferred to one transfer stage, one field signals must be transferred by dividing it into several signals in the column direction. In this case, when the signal charge transferring method explained in the second driving method is adopted, it is possible to easily rearrange or transfer row charges which are spatially spaced after several transfer operations into a series of signal charge orders. Further, since all signals detected by the photosensitive elements can be outputted independently for each field, it is possible to easily realize so-called perfect field read out, so that the vertical resolution can be improved by performing vertical correlation processing between photosensitive element signals.

A third driving method of the first embodiment will be described with reference to FIGS. 5(a) to 5(d).

In the above-mentioned first and second driving methods, the order of signal charges is changed to any required order by controlling the timing when signal charges are inputted from the column direction transfer device 2 to the cyclic transfer path 12. In contrast, according to the third driving method, the order of the signal charge rearrangement can be changed by controlling the output timing of signal charges from the cyclic transfer path 12.

Figures 5A, 5B, 5C, 5D:
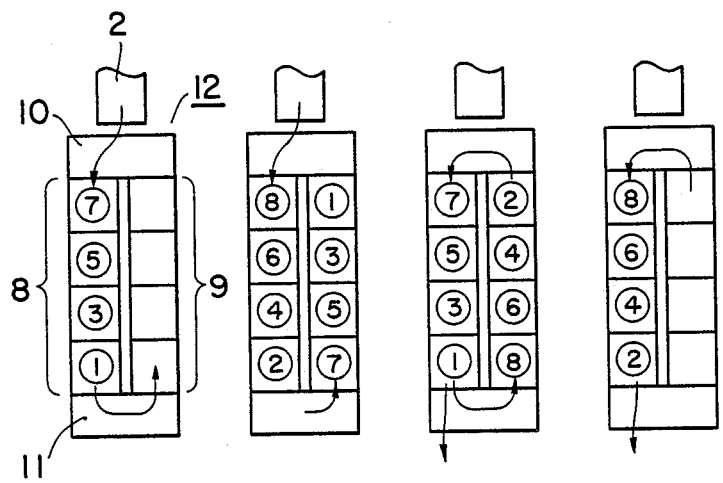
FIGS. 5(a) to 5(d) are a series of illustrations showing the same devices useful to explain a third driving method of the first, embodiment.

At the first column direction transfer operation, odd numbered signal charges ①, ③, ⑤ and ⑦ are transferred, and the cyclic transfer path 12 receives these signal charges in the order of ①, ③, ⑤ and ⑦ as shown in FIG. 5(a). At the succeeding second column direction transfer operation, even numbered signal charges ②, ④, ⑥ and ⑧ are transferred and the cyclic transfer path 12 receives these signal charges ②, ④, ⑥ and ⑧ in the order mentioned after the signal charges ①, ③, ⑤ and ⑦ have been received, as shown in FIG. 5(b).

Thereafter, when the first signal charge ① is transferred to the lowermost transfer stage of the left charge storage/transfer device 8 as shown in FIG. 5(c), a voltage is applied to the row directional charge transfer device 6 to output the signal charge ① to the row directional charge transfer device 6 via the second connecting section 11. The remaining signal charges ③, ⑤ and ⑦ are transferred again to the right charge storage/transfer device 9. Thereafter, when the signal charge ② is transferred to the lowermost transfer stage of the left charge storage/transfer device 8 as shown in FIG. 5(d), a voltage s applied again to the row directional charge transfer device 6 to output the signal charge ② to the row directional charge transfer device 6.

By repeating the same transfer operation, signal charges stored in the cyclic transfer path 12 in the order of ①, ③, ⑤, ⑦, ②, ④, ⑥ and ⑧ are outputted in the order of ①, ②, ③, ④, ⑤, ⑥, ⑦ and ⑧.

As described above, in the third driving method, it is possible to output signal charges in any desired order irrespective of the order in the cyclic transfer path 12, by controlling the timing of applying voltage to the cyclic transfer path 12 and the row directional charge transfer device 6.

The construction and the driving method of the second embodiment of the cyclic transfer path of the present invention will be described with reference to FIGS. 6(a) to 6(e). In this second embodiment, since the photosensitive elements, the row directional charge transfer device and the output circuit are all the same as those shown in the first embodiment shown in FIG. 2, the description thereof is omitted herein.

In this embodiment, the cyclic transfer path 13 is made up of a pair of charge storage/transfer devices 14 and 15 each having two transfer stages, respectively. That is, the cyclic transfer path 13 comprises 4 stage transfer path which is equal to one half of the number of the photosensitive elements. Further, although not shown, the number of stages of the column directional charge transfer path 16 is two, and therefore one transfer stage corresponds to 4 photosensitive elements.

Figures 6A, 6B, 6C, 6D, 6E:
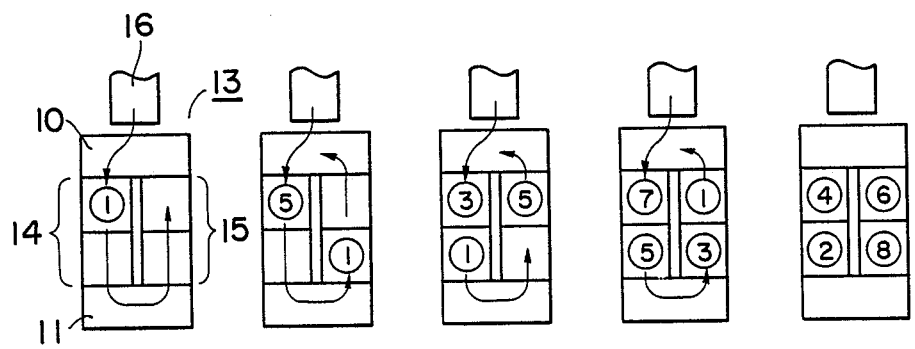
FIGS. 6(a) to 6(e) are a series of partial block diagrams showing only the charge storage/transfer devices useful to explain a second embodiment of a solid state image pickup apparatus of the present invention and a driving method of the same.

In the same way as in the second driving method of the first embodiment, one field column directional transfer is attained by two column directional transfer operations. At the first column directional transfer operation, signal charges ① and ⑤ are transferred as shown in FIGS. 6(a) and 6(b). At the second column directional transfer operation, signal charges ③ and ⑦ are transferred to and stored in the cyclic transfer path 13 as shown in FIGS. 6(c) and 6(d). Thereafter, signal charges are outputted to the row directional charge transfer device 6 in the order of ①, ③, ⑤ and ⑦. At the subsequent third and fourth column directional transfer operations, even numbered signal charges ②, ④, ⑥ and ⑧ are transferred to the cyclic transfer path 13 as shown in FIG. 6(e), and then outputted in the same manner as described above. As explained above, one field signal charges are read out in the order of odd numbers ①, ③, ⑤ and ⑦ and even numbers ②, ④, ⑥ and ⑧. Further, it is of course possible to perform the field storage and read out operations in the same manner as in the prior art solid state image pickup apparatus. That is, it is possible to transfer and output composite charges ①+②, ③+④, ⑤+⑥, and ⑦+⑧ at the first field and then composite charges ②+③, ④+⑤, and ⑥+⑦ at the succeeding field.

In this second embodiment, it is impossible to perform perfect field reading operation. However, this method is effective for miniaturization of the photosensitive elements. In other words, the width of the column directional charge transfer path can be minimized and the light receiving area (aperture ratio) of the photosensitive elements can be maximized, whereby higher sensitivity and higher S/N ratio can be obtained.

Figure 7:
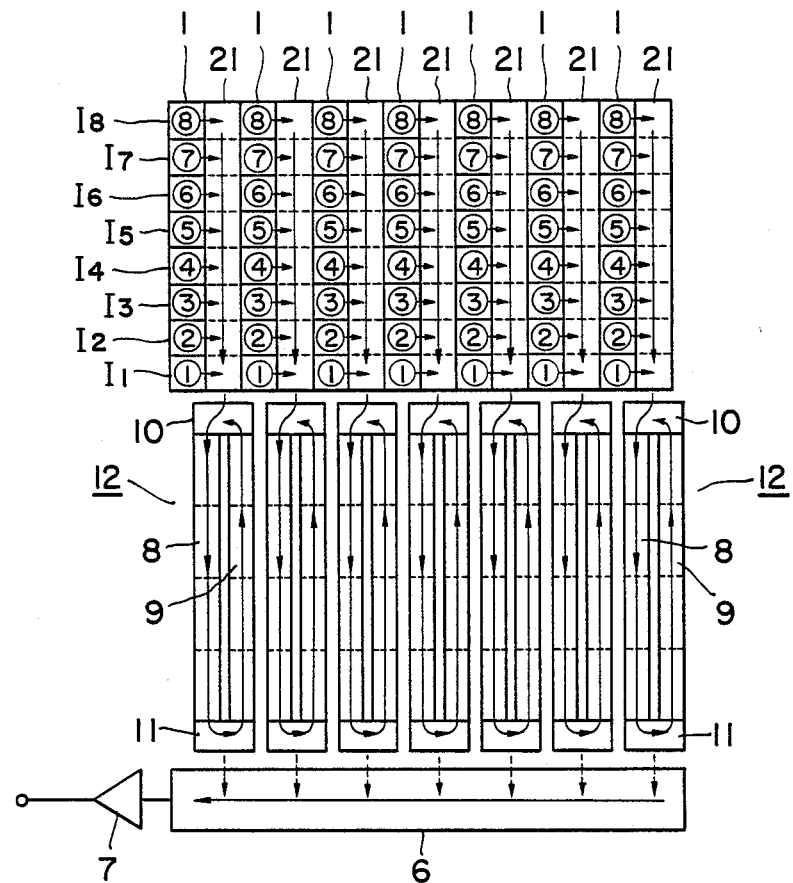
FIG. 7 is a block diagrams showing a third embodiment of a solid state pickup apparatus of the present invention.

FIG. 7 shows a third embodiment of the present invention, which is different from the first embodiment shown in FIG. 2 in that no interlace method is adopted to read out signal charges by the column directional transfer device 21. That is, the column directional transfer device 21 has 8 transfer stages each corresponding to each one of photosensitive elements $I_1$ to $I_8$ and can simultaneously read out and transfer signal charges of the adjacent rows.

Two methods of driving this non-interlace type solid state image pickup apparatus as an interlace type apparatus by the use of a cyclic transfer path 12 will be described with reference to FIGS. 8 and 9.

That is, the first driving method of the third embodiment will be described with reference to FIGS. 8(a) to 8(e). In this first method, one frame column directional transfer operation is divided into 4 operations, and signal charges of two adjacent rows are transferred by one column directional transfer operation.

Figures 8A, 8B, 8C, 8D, 8E:
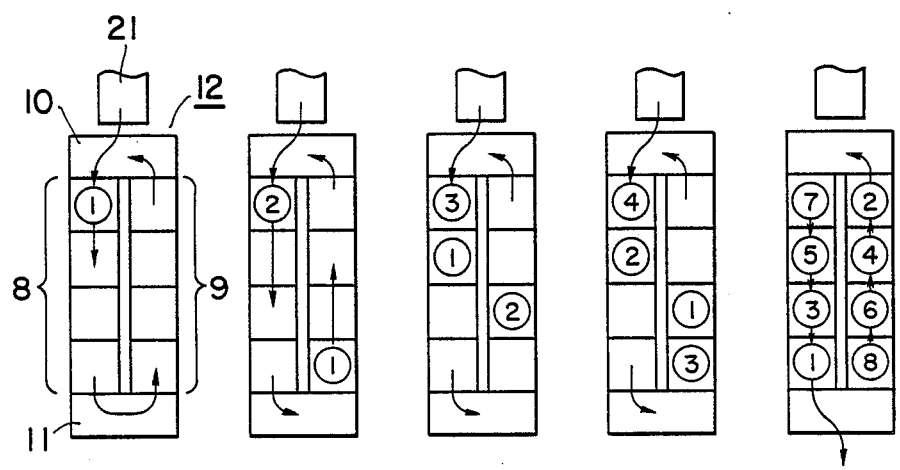
FIGS. 8(a) to 8(e) are a series of illustrations showing charge storage/transfer devices useful to explain a first driving method of the third embodiment.

As shown in FIG. 8(a), a signal charge ① is transferred to the cyclic transfer path 12 at the first column directional transfer operation. The cyclic transfer path 12 receives the signal charge ① and transfers it through 4 stages. When the signal charge ① is transferred to the right charge storage/transfer device 9, the cyclic transfer path 12 receives the succeeding signal charge ②. As described above, the signal charges ① and ② transferred by the first column directional transfer operation are stored in the cyclic transfer path 12 with 3 empty transfer stages interposed between the two signal charges as shown in FIG. 8(b).

At the succeeding second column directional transfer operation, a signal charge ③ is transferred to an empty transfer stage following the signal charge ① in the cyclic transfer path 12 as shown in FIG. 8(c). Thereafter, a signal charge ④ is transferred to an empty transfer stage following the signal charge ② as shown in FIG. 8(d).

The third and fourth column directional transfer operations are performed in the same manner. As a result, as shown in FIG. 8(e), even numbered signal charges ②, ④, ⑥ and ⑧ are arranged after odd numbered signal charges ①, ③, ⑤ and ⑦, and all signal charges 1 to 8 thus arranged are stored in the cyclic transfer path 12. Thereafter, the signal charges are outputted to the row directional charge transfer device 7 in accordance with the order determined in this cyclic transfer path 12.

Figures 9A, 9B, 9C, 9D, 9E:
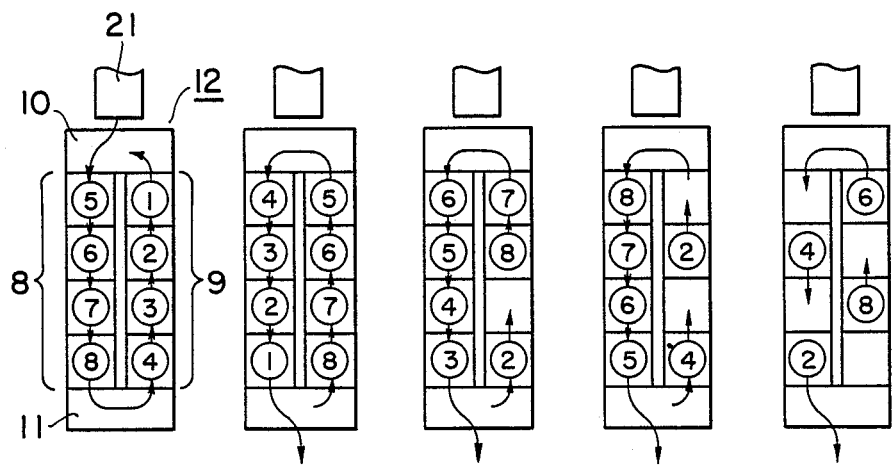
FIGS. 9(a) to 9(e) are a series of illustrations showing the charge storage/transfer device useful to explain a second driving method of the third embodiment.

In the above mentioned first driving method, the signal charge arrangement sequence is converted so as to be applicable to the interlace method by controlling the timing when signal charges are inputted to the cyclic transfer path 12. In contrast, in the second driving method shown in FIGS. 9(a) to 9(e), the same function can be achieved by controlling the timing when signal charges are outputted from the path 12. As shown in FIG. 9(a), signal charges ① to ⑧ are transferred in the order mentioned from the column directional transfer device 21 to the cyclic transfer path 12. Thereafter, as shown in FIG. 9(b), the first signal charge ① is outputted from the cyclic transfer path 12. The succeeding signal charge ② is not outputted but transferred cyclically. The signal charge ③ is outputted as shown in FIG. 9(c). In the same manner, the signal charge ⑤ is outputted as shown in FIG. 9(d), and thereafter the signal charge ⑦ is outputted.

As described above, after the odd numbered signal charges ①, ③, ⑤ and ⑦ have been outputted, the even numbered signal charges ②, ④, ⑥ and ⑧ are outputted as shown in FIG. 9(e).

Figure 10:
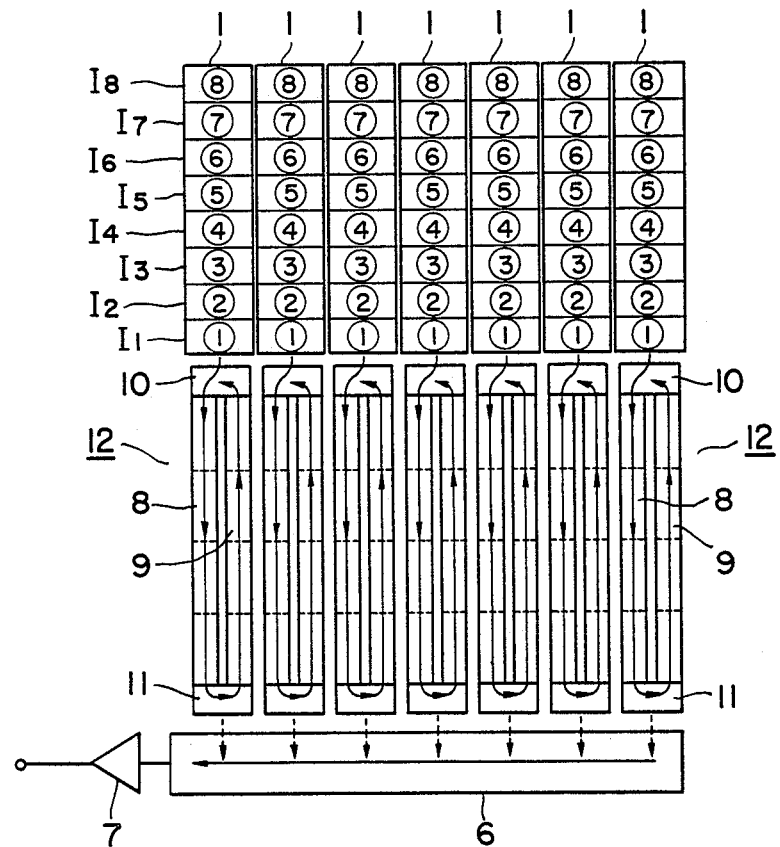
FIG. 10 is a block diagram showing a fourth embodiment of a solid state pickup apparatus of the present invention.

FIG. 10 shows a fourth embodiment of the present invention. The aforementioned embodiments are all applied to FIT (frame interline transfer) type solid state image pickup apparatus. In contrast, this fourth embodiment is applicable to FT (frame transfer) type solid state image pickup apparatus.

As shown in FIG. 10, in the apparatus of this type, a series of the photosensitive elements 1 are used in common to act as the column directional transfer device, and signal charges are outputted in the order of the row numbers of 1, 2, 3, ..., 8. Therefore, the charge transfer operation is substantially the same as that of the FIT type apparatus shown in FIG. 7 (which does not adopt interlace method). Therefore, it is possible to read out signal charges in accordance with the interlace method by a FT type solid state image pickup apparatus (which cannot read out signal charges in accordance with the interlace method) with the driving methods as have been described with reference to FIGS. 8 and 9.

Figure 11:
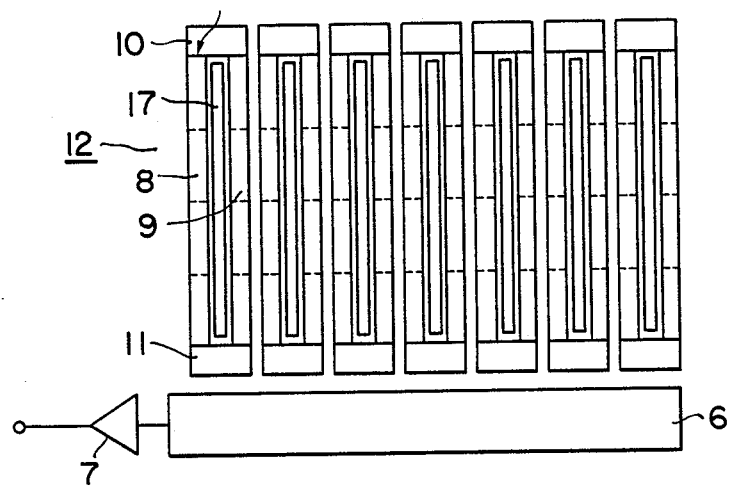
FIG. 11 is a partial block diagram showing only the charge storage/transfer devices useful to explain a fifth embodiment of a solid state image pickup apparatus of the present invention.

FIG. 11 shows a fifth embodiment of the present invention. The construction of the photosensitive elements and the column directional charge transfer apparatus are substantially the same as those used in the first embodiment shown in FIG. 2, and therefore the description thereof is omitted herein.

This embodiment is different from the first embodiment shown in FIG. 2 in that a parallel transfer device 17 is provided between a pair of charge storage/transfer paths 8 and 9 constituting the cyclic transfer path 12 and that the right charge storage/transfer device 9 is provided with a function to transfer signal charges not only in the upward direction but also in the downward direction. The parallel transfer device 17 has parallel transfer function to simultaneously transfer signal charges from the right charge storage transfer device 9 to the left charge storage transfer device 8 and vice versa.

A driving method of the fifth embodiment will be described with reference to FIGS. 12(a) to 12(d).

Figures 12A, 12B, 12C, 12D:
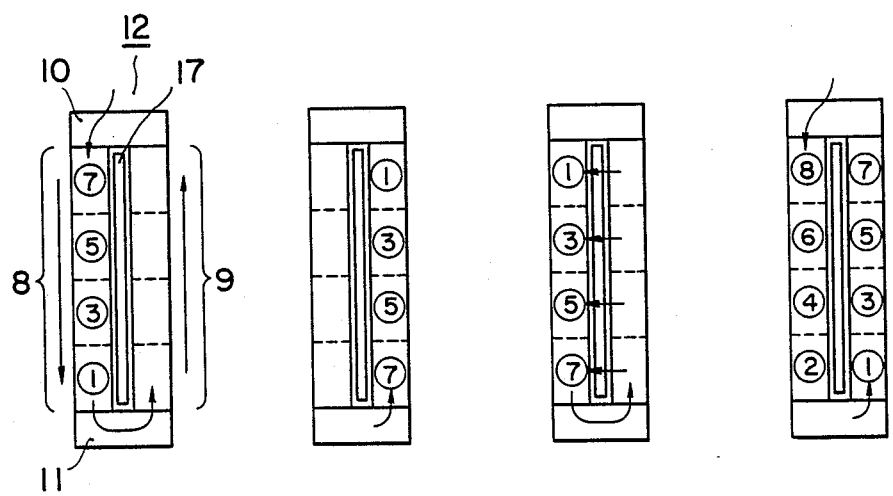
FIGS. 12(a) to 12(d) are a series of illustrations showing the charge storage/transfer device useful to explain a driving method of the fifth embodiment.

The left charge storage/transfer device 8 continuously receives odd numbered signal charges ①, ③, ⑤ and ⑦ as shown in FIG. 12(a), and cyclically transfers the received signal charges to the right charge storage/transfer device 9 as shown in FIG. 12.

Thereafter, the parallel transfer device 17 parallelly transfers the signal charges ①, ③, ⑤ and ⑦ in the right charge storage/transfer device 9 to the left charge storage/transfer device 8, as shown in FIG. 12(c). By this parallel transfer operation, the order of arrangement of the signal charges and ①, ③, ⑤ and ⑦ is reversed into the order of ⑦, ⑤, ③ and ①. Thereafter, the signal charges ⑦, ⑤, ③ and ① are transferred cyclically to the right charge storage/transfer device 9, and simultaneously even numbered signal charges ②, ④, ⑥ and ⑧ are transferred from the column directional transfer device 2 to the left charge storage/transfer device 8. Therefore, as shown in FIG. 12(d) the signal charges are arranged in the charge storage/transfer devices 8 and 9 in the order of smaller row numbers beginning from the lowermost stage. Thereafter, the two charge storage/transfer devices 8 and 9 alternately transfer signal charges in the downward direction so that the signal charges are outputted to the row directional charge transfer device 6 in the row numerical order of ①, ②, ③, ④, ⑤, ⑥, ⑦ and ⑧.

As described above, in the fifth embodiment, it is possible to reduce the time required for successively rearranging the charges by the cyclic transfer operation by using a method in which the order of the signal charges in the cyclic transfer path is simultaneously rearranged with the parallel transfer device 17.

Further, it is possible to operate this fifth embodiment by the same driving methods as those described in the first embodiment. Further, the fifth embodiment has been applied to the FIT type solid state image pickup apparatus. However, it is possible to incorporate the parallel transfer device in the FT type solid state image pickup apparatus as shown in FIG. 10.

Figure 13:
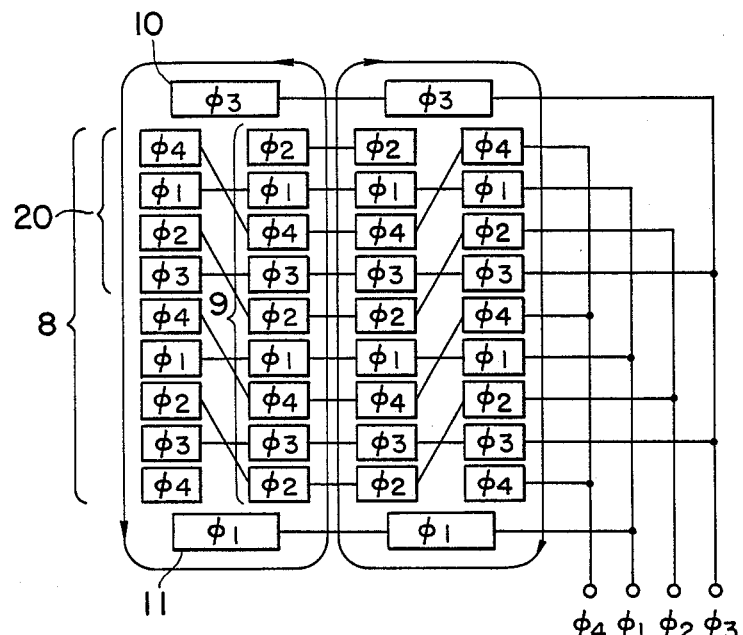
FIG. 13 is a block diagram showing a first modification of electrodes incorporated in the cyclic transfer paths of the apparatus of the present invention.

FIG. 13 shows a modification of an electrode construction of the cyclic transfer path of the present invention. Further, FIG. 14 shows another modification of the cyclic transfer path provided with a parallel charge transfer device.

As shown in FIG. 13, each transfer stage 20 of the cyclic transfer path includes 4 electrodes, and 4 different phase transfer pulses $\Phi_1$ to $\Phi_4$ are applied to each electrode in accordance with the well known 4 layer driving method. In this case, where a double layer polycrystalline silicon electrode construction, for instance, is used for the electrode structure in such manner that the first and third phase ($\Phi_1$ and $\Phi_3$) electrodes are formed by a first polycrystalline silicon layer and the second and fourth phase ($\Phi_2$ and $\Phi_4$) electrodes are formed by a second polycrystalline silicon layer, it is possible to integrate the same phase electrodes of all cyclic transfer paths.

Figure 14:
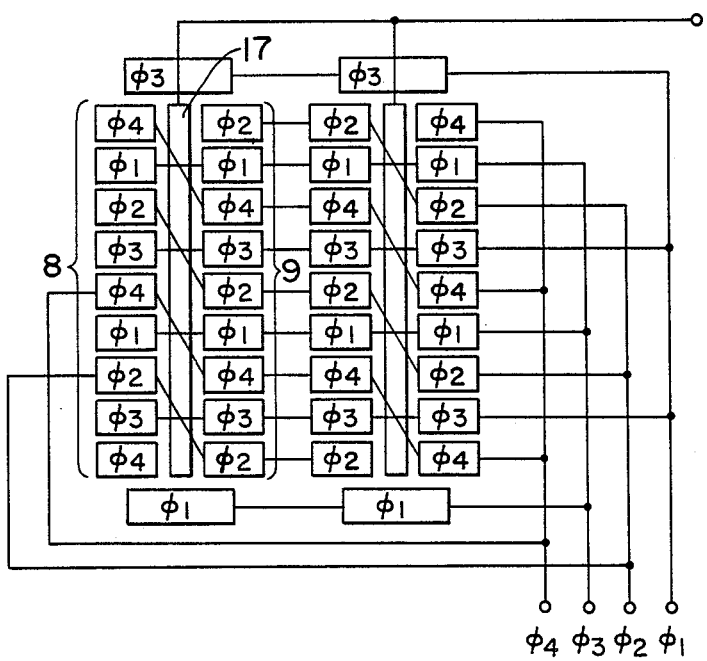
FIG. 14 is a block diagram showing the second modification of the electrodes incorporated therein.

Furthermore, in either of the modifications shown in FIGS. 13 and 14, the phase transfer pulses $\Phi_1$ to $\Phi_4$ are applied to the electrodes provided in each of the cyclic transfer paths such that in two adjacent cyclic transfer paths, signal charges are transferred in mutually opposite cyclic transfer directions. In this manner, wiring between two same-phase pulse receiving electrodes, provided in the mutually adjacent cyclic transfer paths can be substantially simplified.

As described above, according to the present invention, since the charge storage/transfer device arranged on the lower side of the column directional charge transfer device is provided with the cyclic transfer path, it is possible to read out or output signal charges at any desired sequence, irrespective of the sequence of the signal charges transferred by the column directional transfer device by controlling the timing at which signal charges are inputted to the cyclic transfer path or outputted from the cyclic transfer path. Therefore, it is possible to easily perform any required method of reading signal charges so as to be subjected to any required signal processing methods, for instance, such as vertical correlation signal charge processing between adjacent rows when the perfect field reading method is carried out.

The preferred embodiments have been described in the specification but this invention is not limited to these embodiments. The present invention can be embodied in different ways without departing from the true spirit and scope of the invention. For instance, in FIGS. 13 and 14 although the number of the electrodes at the transfer stage of the cyclic transfer path is four, it is possible to change this number to three.

What is claimed is:

1. A charge transfer device for a solid state image pickup apparatus of the frame interline transfer type comprising:
    (a) a photosensitive element column including a plurality of photosensitive elements arranged in the column direction;
    (b) a column direction transfer device for receiving a transferring signal charges generated in said photosensitive elements; and
    (c) a charge storage/transfer device for storing and transferring signal charges outputted from said column direction transfer device, said charge storage/transfer device being provided separately from said column direction transfer device and having a cyclic transfer path made up of a plurality of loop-linked transfer stages for storing and transferring said signal charges.

2. The solid state image pickup apparatus of claim 1, wherein one (10) of said plurality of transfer stages (8, 9, 10 and 11) constituting the cyclic transfer path (12) is used in common as an input section of the cyclic transfer path (12) for signal charge reception and another one (11) of said plurality of transfer stages is used in common as an output section of the cyclic transfer path for signal charge transmission.

3. A solid state image pickup apparatus comprising:
    (p1 (a) photosensitive element columns each including a plurality of photosensitive elements for detecting signal charges; and (b) charge storage/transfer devices, each having a cyclic transfer path made up of a plurality of loop-linked transfer stages for storing and transferring the signal charges outputted from said photosensitive element columns, wherein each said charge storage/transfer device comprises a first charge storage/transfer stage for transferring signal charges in a first direction; and a second charge storage/transfer stage for transferring signal charges in a second direction opposite to the first direction, said first and second charge storage/transfer stage being linked with each other at both linkage ends thereof to construct the cyclic transfer path.

4. The solid state image pickup apparatus of claim 3 wherein one linkage end (10) of said first and second charge storage/transfer devices (8 and 9) is used in common as an input section of the cyclic transfer path (12) for signal charge reception and another linkage end (11) of said first and second charge storage/transfer devices is used in common as an output section of the cyclic transfer path (12) for signal charge transmission.

5. A solid state image pickup apparatus comprising:
(a) photosensitive element columns (1) each including a plurality of photosensitive elements (I) for detecting signal charges; and
(b) charge storage/transfer devices, each having a cyclic transfer path made up of a plurality of loop-linked transfer stages for storing and transferring the signal charges outputted from said photosensitive element columns; wherein each of said transfer stages of said cyclic transfer path comprises a plurality of electrodes to each of which one of a plurality of different phase transfer pulses is applied, and wherein all electrodes to which the same phase pulse is applied are formed integral with each other over the entire cyclic transfer path.

6. The solid state image pickup apparatus of claim 5 wherein said phase transfer pulses (($\phi_1$ to $\phi_4$) are applied to said electrodes (20) provided in each cyclic transfer path (12) in a manner such that in two mutually adjacent cyclic transfer paths, said signal charges are transferred cyclically in directions opposite to each other.

7. A charge transfer device for a solid state image pickup apparatus of the frame interline transfer type comprising:
(a) a photosensitive element column including a plurality of photosensitive elements arranged in the column direction for generating signal charges and transferring said signal charges in the column direction; and
(b) a charge storage/transfer device for storing and transferring signal charges outputted from said photosensitive element column, said charge storage/transfer device being provided separately from said photosensitive element column and having a cyclic transfer path made up of a plurality of loop-linked transfer stages for storing and transferring said signal charges.

8. A solid state image pickup apparatus comprising:
(a) photosensitive element columns each including a plurality of photosensitive elements (I) for detecting signal charges; and
(b) charge storage/transfer devices, each having a cyclic transfer path made up of a plurality of loop-linked transfer stages for storing and transferring the signal charges outputted from said photosensitive element columns; and
(c) parallel transfer devices for simultaneously and parallelly transferring signal charges stored in a predetermined number of transfer stages of said cyclic transfer path to other transfer stages of said cyclic transfer path.

9. The solid state image pickup apparatus of claim 8 wherein said charge storage/transfer device comprises a first charge storage/transfer device (8) for transferring signal charges in a first direction; and a second charge storage/transfer device (9) for transferring signal charges in a second direction opposite to the first direction; said first and second charge storage/transfer devices (8 and 9) being linked with each other at both linkage ends thereof to construct the cyclic transfer path (12); and a parallel transfer device (17) for simultaneously transferring signal charges from said first charge storage/transfer device (8) to said second charge storage/transfer device (9) or vice versa is provided between said first and second charge storage/transfer devices (8 and 9).

10. The solid state image pickup apparatus of claim 9 wherein one linkage end (10) of each of said first and second charge storage/transfer devices (8 and 9) is used in common as an input section of the cyclic transfer path (12) for signal charge reception and the other linkage end (11) of each of said first and second charge storage/transfer devices (8 and 9) is used in common as an output section of the cyclic transfer path (12) for signal charge transmission.

11. A method of driving a solid state image pickup apparatus having photosensitive element columns (1) each including a plurality of photosensitive elements (I) for detecting signal charges; and charge storage/transfer devices each having a cyclic transfer path (12) made up of a plurality of loop-linked transfer stages (8, 9, 10 and 11) for receiving and transferring the signal charges outputted from said photosensitive element column, said method comprising the steps of:
(a) cyclically transferring received signal charges in said cyclic transfer path (12); and
(b) controlling timings at which succeeding signal charges are received by said cyclic transfer path to rearrange a sequence of the signal charges in a desired order.

12. The method of driving a solid state image pickup apparatus of claim 11 wherein a sequence of the signal charges is rearranged in a desired order, said method comprising the steps of:
(a) transferring all signal charges detected by the photosensitive element column (1) to the cyclic transfer path (12) by dividing all the signal charges into several groups along the column direction;
(b) receiving a group of a predetermined number of signal charges transferred in the column direction by the cyclic transfer path (12) with a predetermined number of empty transfer stages interposed between two transferred signal charges;
(c) cyclically transferring received signal charges;
(d) receiving a predetermined number of signal charges transferred by a succeeding column directional transfer operation at empty transfer stages after the already received signal charges; and
(e) repeating above described steps (a)-(d).

13. The method of driving a solid state image pickup apparatus of claim 12 wherein a sequence of all signal charges is rearranged in the same order as that of the photosensitive elements (I), said method comprising the steps of:

(a) transferring odd numbered signal charges (①, ③, ⑤ and ⑦) of a first field ($I_1$, $I_3$, $I_5$ and $I_7$) detected by the photosensitive element column (1) in an interlace method to the cyclic transfer path (12) by a first column direction transfer operation;

(b) transferring even numbered signal charges (②, ④, ⑥ and ⑧) of a second field ($I_2$, $I_4$, $I_6$ and $I_8$) to the cyclic transfer path (12) in a second column direction transfer operation;

(c) receiving said odd numbered signal charges (①, ③, ⑤ and ⑦) of the first field by the cyclic transfer path (12) with a single empty transfer stage interposed between the two received signal charges; and (d) receiving said even numbered signal charges (②, ④, ⑥ and ⑧) of the second field by the cyclic transfer path (12) at the single empty transfer stage interposed between the signal charges (①, ③, ⑤ and ⑦) of the first field.

14. The method of driving a solid state image pickup apparatus of claim 12 wherein a sequence of all signal charges is rearranged in the same order as that of the photosensitive elements (I), said method comprising the steps of:

(a) transferring signal charges (① and ⑤) at intervals of a predetermined row number of the first field ($I_1$, $I_3$, $I_5$ and $I_7$) detected by the photosensitive element column (1) in an interlace method to the cyclic transfer path (12) by a single column direction transfer operation;

(b) transferring signal charges (② and ⑥) at intervals of a predetermined row number of a second field ($I_2$, $I_4$, $I_6$ and $I_8$) to the cyclic transfer path (12) by a single column direction transfer operation;

(c) repeating the above described steps (a) and (b);

(d) receiving the signal charges (① and ⑤) transferred at intervals of a predetermined row number of the first field by the single column directional transfer operation through the cyclic transfer path (12) with predetermined empty transfer stages interposed between the two received signal charges;

(e) receiving the signal charges (② and ⑥) transferred at intervals of a predetermined row number of the second field by a succeeding column directional transfer operation through the cyclic transfer path (12) at empty transfer stages just after the received signal charges (1 and 5) of the first field; and (f) repeating above described steps (a)–(e).

15. The method of driving a solid state image pickup apparatus of claim 12 wherein a sequence of all signal charges is rearranged in such an order that even numbered signal charges (②, ④, ⑥ and ⑧) of the second field are arranged after odd numbered signal charges (①, ③, ⑤ and ⑦) of the first field in interlace method, said method comprising the steps of:

(a) transferring two signal charges (① and ②) of two adjacent photosensitive elements ($I_1$ and $I_2$) of the photosensitive element column (1) to the cyclic transfer path (12) by a single column directional transfer operation;

(b) transferring two signal charges (③ and ④) of succeeding two adjacent photosensitive elements ($I_3$ and $I_4$) to the cyclic transfer path (12) by a single column directional transfer operation;

(c) repeating above described steps (a) and (b);

(d) receiving the two signal charges (① and ②) transferred by the single column directional transfer operation through the cyclic transfer path (12) at intervals of transfer stages corresponding to the number of rows of one field in the interlace method;

(e) receiving the two signal charges (③ and ④) transferred by a succeeding column directional transfer operation at empty transfer stages just after the received signal charges (① and ②); and (f) repeating above described steps (a)–(e).

16. A method of driving a solid state image pickup apparatus having photosensitive element columns (1) each including a plurality of photosensitive elements (I) for detecting signal charges; and charge storage/transfer devices each having a cyclic transfer path (12) made up of a plurality of loop-linked transfer stages (8, 9, 10 and 11) for receiving and transferring the signal charges outputted from said photosensitive element column, said method comprising the steps of:

(a) cyclically transferring received signal charges by said cyclic transfer path (12); and (b) controlling timings at which the cyclically transferred signal charges are outputted from said cyclic transfer path for outputting the signal charges in any given order.

17. The method of driving a solid state image pickup apparatus of claim 16, which further comprises the steps of:

(a) transferring signal charges (①, ③, ⑤ and ⑦) of the first field of the photosensitive element column (1) to the cyclic transfer path (12) by a first column directional transfer operation in an interlace method;

(b) transferring signal charges (②, ④, ⑥ and ⑧) of the second field to the cyclic transfer path (12) by a second column directional transfer operation;

(c) continuously receiving signal charges (①, ③, ⑤, ⑦, ②, ④, ⑥ and ⑧), transferred by the first and second column directional transfer operations without interposing any empty transfer stage between two signal charges; and (d) after all signal charges (①, ③, ⑤, ⑦, ②, ④, ⑥ and ⑧) have been received, outputting all signal charges in the same order as that of the photosensitive elements (I).

18. The method of driving a solid state image pickup apparatus of claim 15 further comprising the steps of:

(a) transferring signal charges (①, ②, ③, ④, ⑤, ⑥, ⑦ and ⑧) of the photosensitive element column (1) to the cyclic transfer path (12) in the order of an arrangement of photoelectric elements;

(b) continuously receiving the signal charges (①, ②, ③, ④, ⑤, ⑥, ⑦ and ⑧) by the cyclic path (12) without interposing any empty transfer stage between two signal charges;

(c) after all signal charges have been received, outputting signal charges (①, ③, ⑤ and ⑦) of the first field in an interlace method in the order of the number of rows; and (d) after the first field signal charges (①, ③, ⑤ and ⑦) have been outputted, outputting signal charges (②, ④, ⑥ and ⑧) of the second field in the order of the number of rows.

19. A method of driving a solid state image pickup apparatus including:

photosensitive element columns (1) each having a plurality of photosensitive elements; and charge storage/transfer devices for storing and transferring signal charges outputted from said photosensitive element column (1), each of which includes:

first and second charge storage/transfer devices (8 and 9) linked at both ends thereof to form a cyclic transfer path for cyclically transferring signal charges in either direction; and a parallel transfer device (17) disposed between the first and second charge storage/transfer devices (8 and 9), said method comprising the steps of:

(a) transferring signal charges (①, ③, ⑤ and ⑦) of a first field of the photosensitive element column (1) in an interlace method to a cyclic transfer path (12) by a first column directional transfer operation;

(b) transferring signal charges (②, ④, ⑥ and ⑧) of a second field of the photosensitive element column (1) to the cyclic transfer path (12) by a second column directional transfer operation;

(c) continuously receiving signal charges (①, ③, ⑤ and ⑦) transferred in the first column directional transfer operation by the first charge storage device (8) of the cyclic transfer path (12);

(d) cyclically transferring received signal charges to the second charge storage device (9);

(e) simultaneously transferring the signal charges (①, ③, ⑤ and ⑦) in the second charge storage device (9) to the first charge storage device (8) by the parallel transfer device (17) to reverse an arrangement order of the signal charges;

(f) cyclically transferring the signal charges (⑦, ⑤, ③ and ①) of the first charge storage device (8) to the second charge storage/transfer device (9) by the cyclic transfer device (12);

(g) continuously receiving signal charges (②, ④, ⑥, and ⑧) of the second column directional transfer by the first charge storage/transfer device (8); and (h) alternately outputting signal charges (①, ②, ③, ④, ⑤, ⑥, ⑦ and ⑧) by the first and second charge transfer devices.

* * * * *